US008621936B2

(12) United States Patent
McDonald et al.

(10) Patent No.: US 8,621,936 B2
(45) Date of Patent: Jan. 7, 2014

(54) FLOW CELL FOR A FLOW METER

(75) Inventors: Benjamin Edward McDonald, Holliston, MA (US); Mykhaylo Barsukov, Acton, MA (US)

(73) Assignee: General Electric Company, Schenectady, NY (US)

( * ) Notice: Subject to any disclaimer, the term of this patent is extended or adjusted under 35 U.S.C. 154(b) by 190 days.

(21) Appl. No.: 13/279,895

(22) Filed: Oct. 24, 2011

(65) Prior Publication Data
US 2013/0098167 A1 Apr. 25, 2013

(51) Int. Cl.
*G01F 1/20* (2006.01)
(52) U.S. Cl.
USPC ...................................... 73/861.18
(58) Field of Classification Search
USPC ............... 73/861.18, 861.27, 861.31, 861.29
See application file for complete search history.

(56) References Cited

U.S. PATENT DOCUMENTS

| 4,646,575 | A * | 3/1987 | O'Hair et al. | 73/861.31 |
| 7,735,380 | B2 * | 6/2010 | Groeschel et al. | 73/861.27 |
| 2010/0229654 | A1 | 9/2010 | Ao et al. | |
| 2011/0162461 | A1 * | 7/2011 | Allen | 73/861.18 |

OTHER PUBLICATIONS

Altosonic V, Technical Datasheet, 5—Beam ultrasonic flowmeter for custody transfer of liquid hydrocarbons, Krohne, Apr. 2006, 20 pages.
Altosonic III, Technical Datasheet, Cost effective 3-beam ultrasonic flowmeter for custody transfer of liquid hydrocarbons, Krohne, Apr. 2006, 20 pages.
Cameron—LEFM 280Ci, Ultrasonic Flow Meter, Measurement Systems, Copyright 2010 Cameron International Corporation, 6 pages.
Cameron—LEFM 280CiRN, Ultrasonic Flow Meters, Measurement Systems, Cameron International Corporation, 6 pages.

\* cited by examiner

*Primary Examiner* — Jewel V Thompson
(74) *Attorney, Agent, or Firm* — Hiscock & Barclay LLP

(57) ABSTRACT

A flow cell for a plurality of sensor assemblies to communicate with a flow meter for measuring characteristics. The flow cell includes a sensor body with a sensor body bore extending through the sensor body. The flow cell also includes a sensor body quadrant extending outwardly from the sensor body bore on a side of the flow cell, wherein the sensor body quadrant intersects the sensor body bore. A plurality of sensor ports extend through the sensor body quadrant to provide openings from the exterior of the flow cell to the sensor body bore in which sensor assemblies can be inserted. A cable channel extends internally within the sensor body quadrant at least from the plurality of sensor ports to an access port on the exterior of the flow cell for routing cables from the sensor ports to communicate with the flow meter.

20 Claims, 8 Drawing Sheets

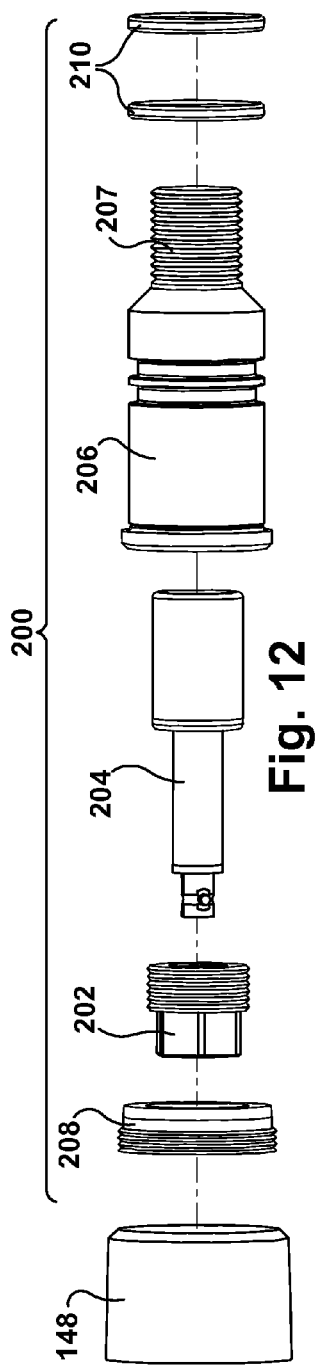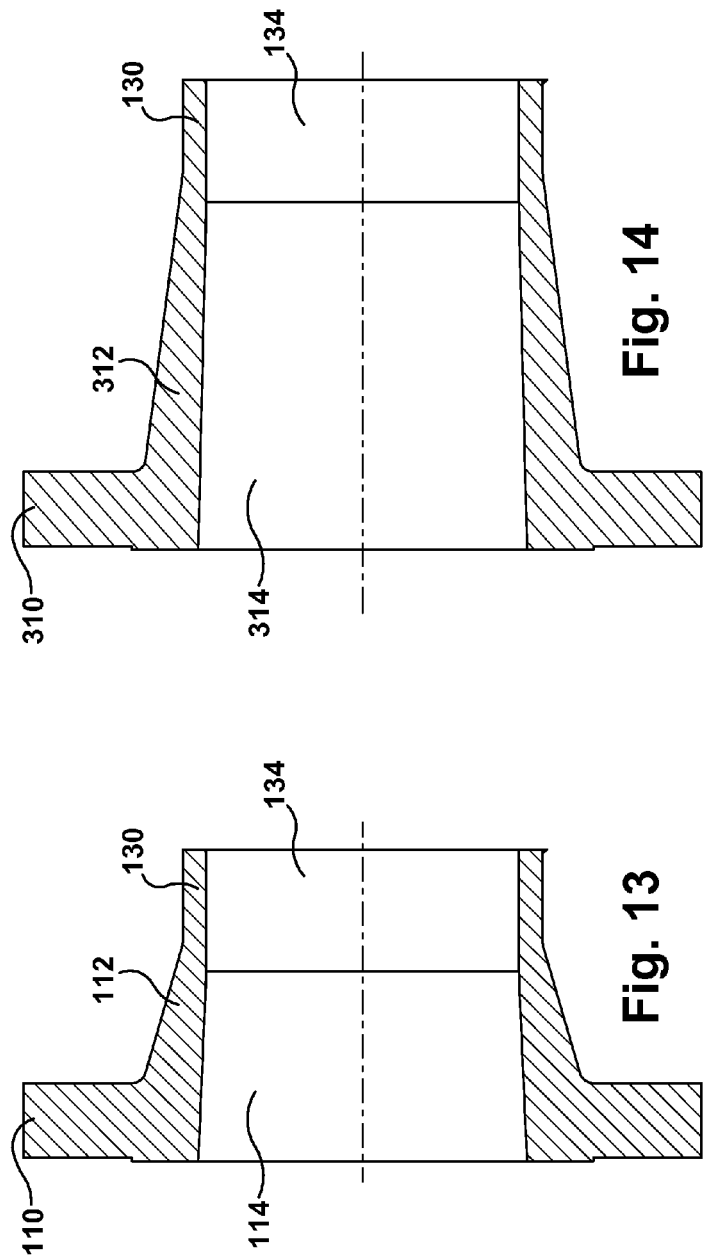

FLOW CELL FOR A FLOW METER

BACKGROUND OF THE INVENTION

The subject matter disclosed herein relates to a flow cell for a flow meter.

Flow meters, including ultrasonic flow meters, are used to determine the characteristics (e.g., flow rate, pressure, temperature, etc.) of fluids (e.g., liquids, gases, etc.) flowing in pipes of different sizes and shapes. Knowledge of these characteristics of the fluid can enable other physical properties or qualities of the fluid to be determined. For example, in some custody-transfer applications, the flow rate can be used to determine the volume of a fluid (e.g., oil or gas) being transferred from a seller to a buyer through a pipe to determine the costs for the transaction, where the volume is equal to the flow rate multiplied by the cross sectional area of the pipe.

In one type of ultrasonic flow meter employing transit time flow metering, one or more pairs of ultrasonic transducers can be installed in or on a flow cell, where each pair can contain transducers located upstream and downstream from each other forming an ultrasonic path between them at a particular chord location across the pipe. FIG. 1 illustrates an existing flow cell with a total of four ultrasonic paths formed by four pairs of upstream and downstream transducer assemblies (i.e., total of eight transducer assemblies—two for each ultrasonic path). Each transducer, when energized, transmits an ultrasonic signal (e.g., a sound wave) along an ultrasonic path through the flowing fluid that is received by and detected by the other transducer. The path velocity of the fluid averaged along the ultrasonic path at a particular chord location can be determined as a function of the differential between (i) the transit time of an ultrasonic signal traveling along the ultrasonic path from the downstream transducer upstream to the upstream transducer against the fluid flow direction, and (2) the transit time of an ultrasonic signal traveling along the ultrasonic path from the upstream transducer downstream to the downstream transducer with the fluid flow direction.

In an existing flow cell construction as shown in FIG. 1, nozzles are welded to the pipe of the flow cell forming ports for the installation of the transducer assemblies. If the corresponding pair of transducer assemblies are not properly aligned or if the ultrasonic path formed by the corresponding pair of transducer assemblies is not precisely located at the desired chord location, this welding process, which can have significant mechanical tolerances, can lead to inaccurate flow rate measurements. In order to provide more precise alignment of transducer assemblies and chord locations over flow cells using welded nozzles, other flow cells are manufactured by machining a forged block of material to form the flow cell and the sensor ports for the transducer assemblies. While this machining process can improve accuracy, the process can be time consuming and expensive.

Also, as can be seen in FIG. 1, in an existing flow cell construction, the transducer assemblies can extend well beyond the diameter of the flanges and the flange-to-flange distance of the flow cell and are connected to the flow meter by cables external to the flow cell. The presence of externally located transducer assemblies and associated cabling increases, e.g., the size, cost, complexity, maintenance, certifications, and time required for flow cell installations, requiring additional fittings, conduits, and junction boxes external to the flow cell. This construction also limits the number of transducer assemblies and sensor ports for the transducer assemblies that can be installed at one location on the flow cell. For example, as shown in FIG. 1, in order to provide four ultrasonic paths (which requires four corresponding pairs of transducer assemblies at four chord locations), since four transducer assemblies cannot be installed at one location on the flow cell (i.e., will not fit in a vertical stack), the sensor ports for the first two pairs of transducer assemblies are located opposite each other in a first plane, while the sensor ports for the second two pairs of transducer assemblies are located opposite each other in a second plane that intersects the first plane. This crisscross configuration results in having the upstream sensor ports for the transducer assemblies from the first two pairs of transducer assemblies upstream from the downstream sensor ports for the two transducer assemblies from the second two pairs of transducer assemblies (or vice versa) on the same side of the flow cell. The presence of these upstream sensor ports and transducer assemblies can cause port effects that can affect the accuracy of the flow rate measurements by the downstream transducer assemblies.

Furthermore, since flow cells are often installed in hazardous locations (e.g., refineries, chemical plants, etc.), the externally routed cables, junction boxes, fittings, covers, etc. need to be rated for use in a hazardous location with the parts and final installation complying with local requirements for such hazardous locations. Since the hazardous location requirements vary throughout the world (e.g., some jurisdictions allow armored cable, some require rigid conduit, some allow flexible conduit, etc.), the same flow cell and flow meter may need several different configurations and different parts depending on where the equipment is installed to comply with local requirements for installation in a hazardous location. For example, for a flow cell machined from a forged block of material with machined sensor ports, a single cover can be used to seal proximate sensor ports. Since the size of the cover will vary depending upon the number of sensor ports and the diameter of the flow cell (e.g., the cover for proximate sensor ports for a 10 in. (25.4 cm) diameter flow cell will be smaller than the cover for proximate sensor ports for a 36 in. (91.44 cm) diameter flow cell), several different covers are needed for the various sized flow cells and each must be certified for use in a hazardous location.

The discussion above is merely provided for general background information and is not intended to be used as an aid in determining the scope of the claimed subject matter.

BRIEF DESCRIPTION OF THE INVENTION

A flow cell that includes a sensor body with internal cable channels for routing cables from the sensor ports to communicate with a flow meter is disclosed. An advantage that may be realized in the practice of some disclosed embodiments of the flow cell is more accurate measurements. Another advantage that may be realized in the practice of some disclosed embodiments of the flow cell, which eliminates external cables between the sensor assemblies and the flow meter, is the reduction in the size, cost, complexity, maintenance, certification, and time required for flow cell installations. The elimination of external cables also can allow for a uniform flow cell with a minimum number of accessories or related components that will need to comply with various hazardous location requirements and ratings, making it easier to obtain worldwide certification.

In one embodiment, a flow cell for a plurality of sensor assemblies to communicate with a flow meter for measuring characteristics of a fluid is disclosed. The flow cell comprises a sensor body, a sensor body bore extending through the sensor body, a first sensor body quadrant extending outwardly from the sensor body bore on a first side of the flow cell, a second sensor body quadrant extending outwardly from the sensor body bore on a second side of the flow cell, wherein the second side is opposite the first side and wherein the first sensor body quadrant and the second sensor body quadrant are aligned with each other and extend in a first plane that intersects the sensor body bore, a first plurality of sensor ports extending through the first sensor body quadrant in the first plane, a second plurality of sensor ports extending through the second sensor body quadrant in the first plane, wherein the first and the second plurality of sensor ports provide openings from the exterior of the flow cell to the sensor body bore in which sensor assemblies can be inserted, a first cable channel extending internally within the first sensor body quadrant at least from the first plurality of sensor ports to a first access port on the exterior of the flow cell, and a second cable channel extending internally within the second sensor body quadrant at least from the second plurality of sensor ports to a second access port on the exterior of the flow cell, wherein the first cable channel and the second cable channel provide openings from the sensor ports in which the cables are routed internally within the flow cell to communicate with the flow meter.

In another embodiment, the flow cell comprises a sensor body, a sensor body bore extending through the sensor body, a first sensor body quadrant extending outwardly from the sensor body bore on a first side of the flow cell, wherein the first sensor body quadrant intersects the sensor body bore, a first plurality of sensor ports extending through the first sensor body quadrant in the first plane, wherein the first plurality of sensor ports provide openings from the exterior of the flow cell to the sensor body bore in which sensor assemblies can be inserted, and a first cable channel extending internally within the first sensor body quadrant at least from the first plurality of sensor ports to a first access port on the exterior of the flow cell, wherein the first cable channel provide openings from the sensor ports in which the cables are routed internally within the flow cell to communicate with the flow meter.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 12 is an exploded view of an exemplary transducer assembly that can be installed in the exemplary flow cell;

FIG. 13 is a cross-section of the first flange and first flange neck of the exemplary full bore flow cell; and FIG. 14 is a cross section of an exemplary flange and flange neck for a reduced bore flow cell.

DETAILED DESCRIPTION OF THE INVENTION

Figure 9:
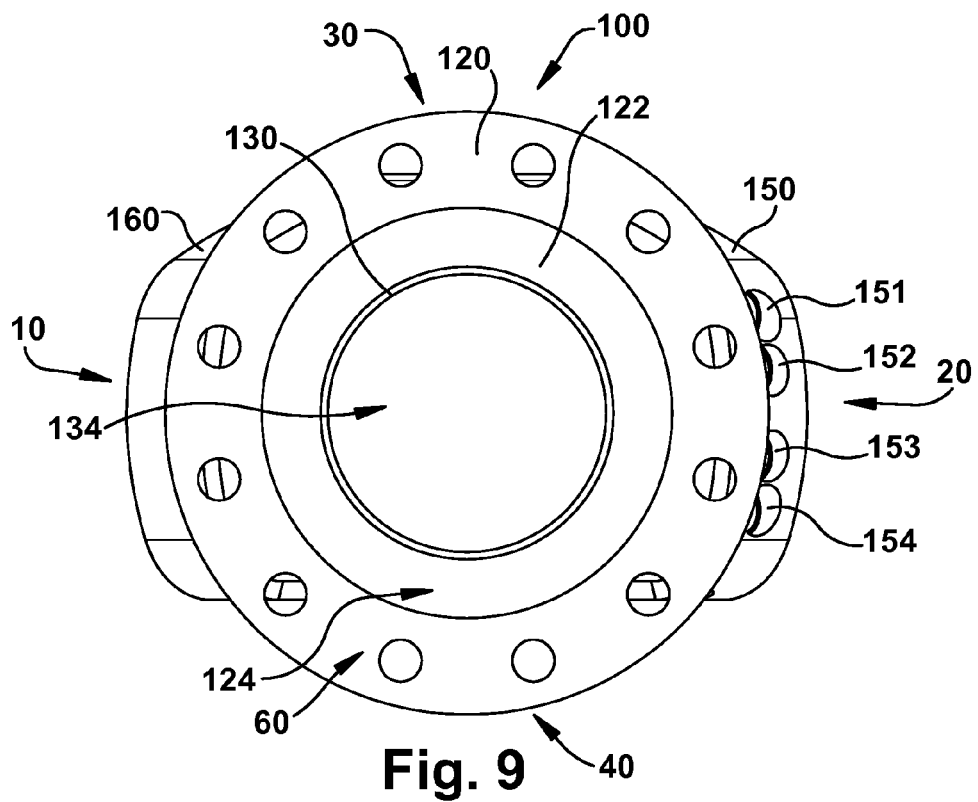
FIG. 9 is an end view of the second end of the exemplary flow cell.

FIGS. 2-9 provide several views of an exemplary flow cell 100, including views of the flow cell's 100 first side 10 (FIGS. 2 and 4), second side 20 (FIGS. 3 and 5), top side 30 (FIG. 6), bottom side 40 (FIG. 7), first end 50 (FIG. 8), and second end 60 (FIG. 9). The exemplary flow cell 100 comprises a first flange 110 at a first end 50 (or downstream end) of the flow cell 100 and a second flange 120 at a second end 60 (or upstream end) of the flow cell 100. A first flow direction arrow 102 on the top side 30 of the flow cell 100 and a second flow direction arrow 104 on the bottom side 40 of the flow cell 100 show the direction that the fluid to be measured will travel in the flow cell 100. A first flange neck 112 connects the first flange 110 to a first end of the sensor body 130, while a second flange neck 122 connects the second flange 120 to a second end of the sensor body 130, which is located between the two flanges 110, 120 and flange necks 112, 122. The first flange 110 and the second flange 120 can connect to the pipes of the system carrying the fluid to be measured (e.g., in a refinery, chemical plant, etc.). A first flange bore 114 extends through the first flange 110 and the first flange neck 112, while a second flange bore 124 extends through the second flange 120 and the second flange neck 122. A sensor body bore 134 extends through the sensor body 130. The fluid to be measured flows through the first flange bore 114, the sensor body bore 134, and the second flange bore 124 of the flow cell.

In one embodiment, the sensor body 130 can include a flow meter cable cavity 106 on the top side 30 of the flow cell 100. A flow meter can be installed on the flow meter cable cavity 106 on the flow cell 100 or can be located remotely from the flow cell 100. The flow meter cable cavity 106 can receive the cables from the sensor assemblies routed internally in the sensor body 130 to communicate with the flow meter as will be described. While the exemplary embodiment of the flow cell 100 is described for use with an ultrasonic flow meter and transducer assemblies, it will be understood that other flow meters and sensor assemblies can be used with the flow cell 100 in other embodiments.

The sensor body 130 can include four sensor body quadrants 140, 150, 160, 170 extending outwardly from the sensor body bore 134. In the exemplary flow cell 100, the first sensor body quadrant 140 extends outwardly from the sensor body bore 134 on the first side 10 of the flow cell 100, while the second sensor body quadrant 150 extends outwardly from the sensor body bore 134 on the second side 20 of the flow cell 100, wherein the second side 20 is opposite the first side 10. The first sensor body quadrant 140 and the second sensor body quadrant 150 are aligned with each other and extend in a first plane 70 that intersects the sensor body bore 134 (see FIG. 7). In the exemplary flow cell 100, the third sensor body quadrant 160 extends outwardly from the sensor body bore 134 on the first side 10 of the flow cell 100, while the fourth sensor body quadrant 170 extends outwardly from the sensor body bore 134 on the second side 20 of the flow cell 100. The third sensor body quadrant 160 and the fourth sensor body quadrant 170 are aligned with each other and extend in a second plane 80 that intersects the sensor body bore 134 and the first plane 70 (see FIG. 7).

In other embodiments, the sensor body 130 may only include a single pair of sensor body quadrants (e.g., only the first sensor body quadrant 140 and the second sensor body quadrant 150). In another embodiment where, e.g., ultrasonic signals are configured to bounce off of the opposite side of the pipe and be received by transducer assemblies on the same side of the pipe, the sensor body 130 may only include a single pair of sensor body quadrants on the same side of the pipe (e.g., only the first sensor body quadrant 140 and the third sensor body quadrant 160). In one embodiment, the first plane 70 and the second plane 80 intersect the sensor body bore 130 diagonally and at an angle of 45 degrees. It will be understood, that other angles of intersection, including non-diagonal intersection could be provided by the flow cell 100 in other embodiments.

The first sensor body quadrant 140 and the second sensor body quadrant 150 of the exemplary flow cell 100 each include four sensor ports in which sensor assemblies (e.g., transducer assemblies, pressure sensor assemblies, temperature sensor assemblies, etc.) can be installed. In one embodiment, transducer assemblies can be installed to form four ultrasonic paths at four chord locations across the sensor body bore 134. In one embodiment, the first sensor body quadrant 140 includes four upstream sensor ports 141, 142, 143, 144 extending through the first sensor body quadrant 140 in the first plane 70, and the second sensor body quadrant 150 includes four downstream sensor ports 151, 152, 153, 154 extending through the second sensor body quadrant 150 in the first plane 70. Each of the sensor ports 141, 142, 143, 144, 151, 152, 153, 154 provides an opening from the exterior of the flow cell 100 to the sensor body bore 134 in which the sensor assemblies can be installed.

In order to form four ultrasonic paths at four chord locations across the sensor body bore 134, the first chord upstream sensor port 141 is aligned with the first chord downstream sensor port 151, the second chord upstream sensor port 142 is aligned with the second chord downstream sensor port 152, the third chord upstream sensor port 143 is aligned with the third chord downstream sensor port 153, and the fourth chord upstream sensor port 144 is aligned with the fourth chord downstream sensor port 154. In the exemplary flow cell 100, there are no sensor ports shown in the third sensor body quadrant 160 or the fourth sensor body quadrant 170, which would be used if there were more than four ultrasonic paths and four chord locations required. It will be understood that, while the exemplary embodiment includes four ultrasonic paths at four chord locations, other embodiments can contain from one ultrasonic path and chord location, to up to eight ultrasonic paths and chord locations (e.g., where all four sensor body quadrants 140, 150, 160, 170 would include four sensor ports) or higher depending upon the particular flow meter application.

Figure 10:
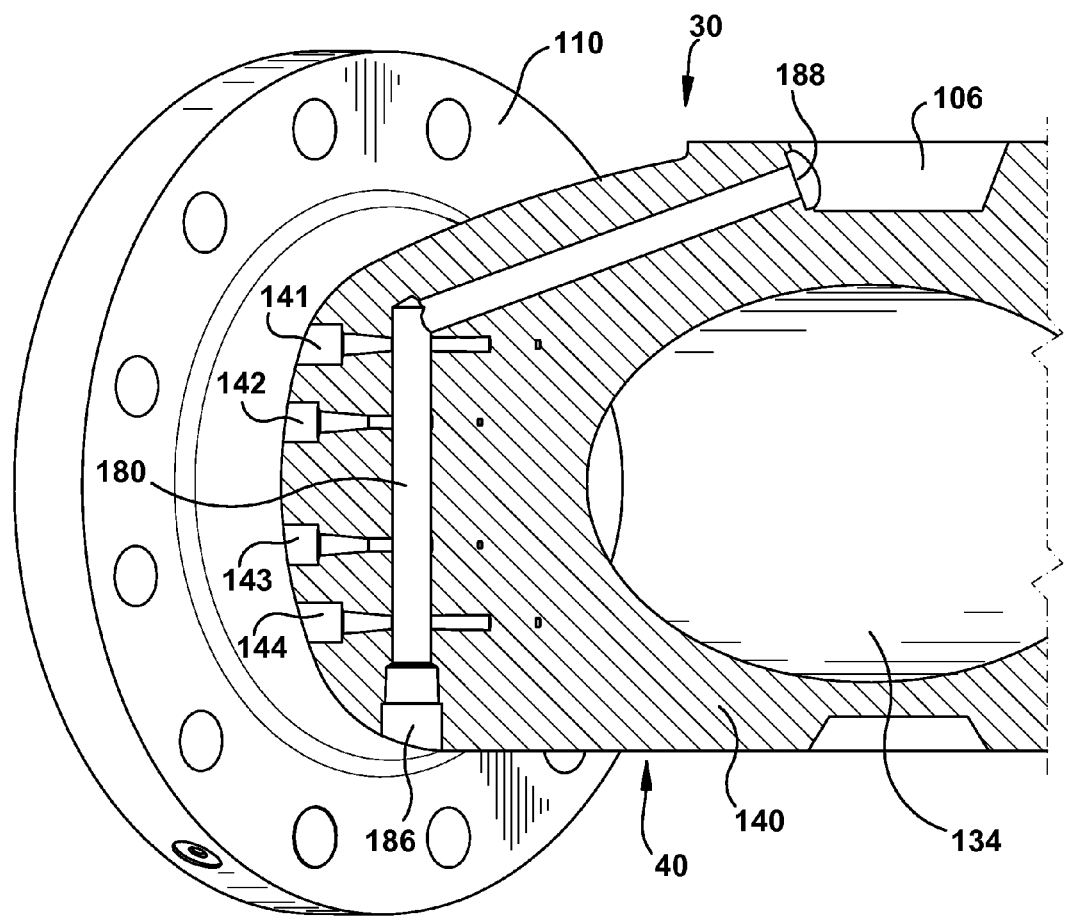
FIG. 10 is a cross-section through the exemplary flow cell illustrating the exemplary cable channel and sensor ports.
Figure 11:
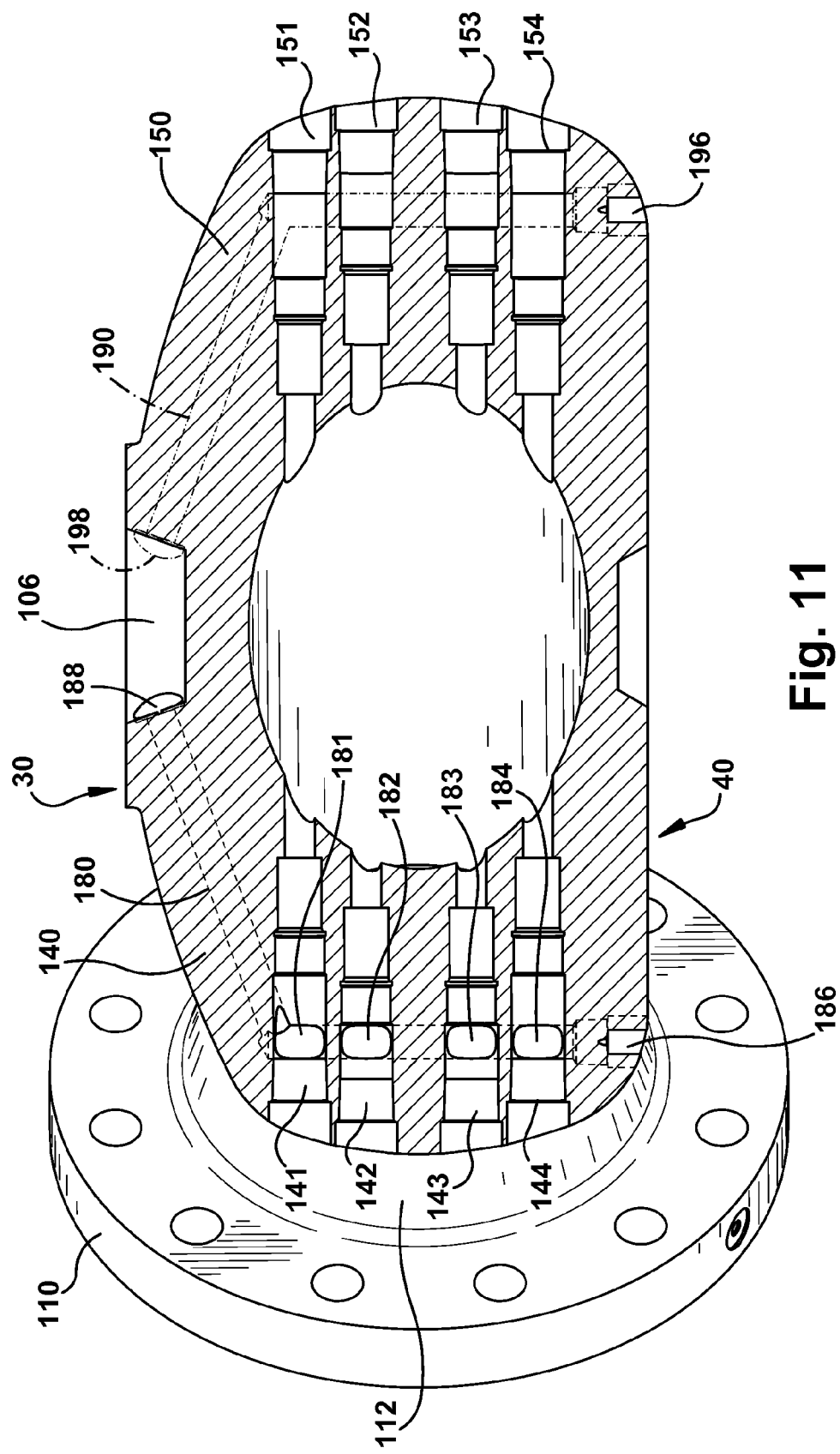
FIG. 11 is a cross-section through the exemplary flow cell illustrating the exemplary cable channel and sensor ports.

FIGS. 10 and 11 are cross-sections (see FIG. 6) through the first sensor body quadrant 140 and the second sensor body quadrant 150 of the exemplary flow cell 100 illustrating the exemplary first quadrant cable channel 180 and the exemplary second quadrant cable channel 190 used for routing cables from the upstream sensor ports 141, 142, 143, 144 and the downstream sensor ports 151, 152, 153, 154 to the flow meter cable cavity 106 to communicate with the flow meter. The cable channels 180, 190 can be formed by drilling into the flow cell 100 and provide openings from the sensor ports 141, 142, 143, 144, 151, 152, 153, 154 in which the cables are routed internally within the flow cell 100 to communicate with the flow meter. In order to provide access to the cables in the cable channels 180, 190, each cable channel 180, 190 can have a plurality of access ports. The exemplary first quadrant cable channel 180 can extend internally within the first sensor body quadrant 140 of the flow cell 100 from a first access port 186 on the bottom side 40 of the flow cell 100 to a second access port 188 in the flow meter cable cavity 106 on the top side 30 of the flow cell. Similarly, the exemplary second quadrant cable channel 190 can extend internally within the first sensor body quadrant 140 of the flow cell 100 from a first access port 196 on the bottom side 40 of the flow cell 100 to a second access port 198 in the flow meter cable cavity 106 on the top side 30 of the flow cell. In other embodiments, the cable channels 180, 190 can extend at least from the sensor ports 141, 142, 143, 144, 151, 152, 153, 154 to the flow meter cable cavity 106, but not extend to the bottom of the flow cell 100.

As shown in FIGS. 10 and 11, at least a portion of the first quadrant cable channel 180 extends proximate each upstream sensor port 141, 142, 143, 144, which each include a sensor port cable window 181, 182, 183, 184 that provides an opening from the upstream sensor ports 141, 142, 143, 144 to the first quadrant cable channel 180 in which the cables from the sensor assemblies in the sensor ports 141, 142, 143, 144 can be routed internally within the flow cell 100 to communicate with the flow meter via the first quadrant cable channel 180. For example, a first chord upstream sensor port cable window 181 connects the first chord upstream sensor port 141 to the first quadrant cable channel 180, a second chord upstream sensor port cable window 182 connects the second chord upstream sensor port 142 to the first quadrant cable channel 180, a third chord upstream sensor port cable window 183 connects the third chord upstream sensor port 143 to the first quadrant cable channel 180, and a fourth chord upstream sensor port cable window 184 connects the second chord upstream sensor port 144 to the first quadrant cable channel 180. While in the exemplary embodiment, the first quadrant cable channel 180 and the second quadrant cable channel 190 each comprise two sections at particular orientations and two access ports, it will be understood that other cable channel configurations with more or less sections and access ports, and with different orientations, can be used. Furthermore, while the exemplary embodiment does not include sensor ports or cable channels for the third sensor body quadrant 160 or the fourth sensor body quadrant 170, it will be understood that if sensor ports were required in those quadrants, cable channels could be provided as disclosed for the first sensor body quadrant 140 and the second sensor body quadrant 150.

Figure 1:
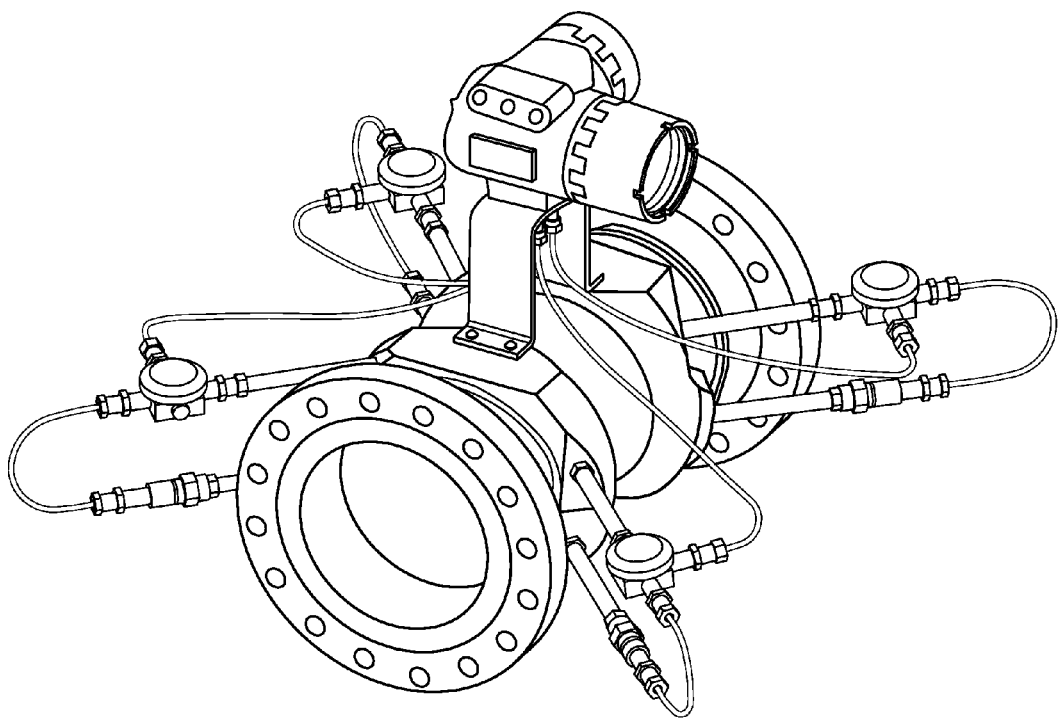
FIG. 1 is a perspective view of a prior art flow cell.
Figure 2:
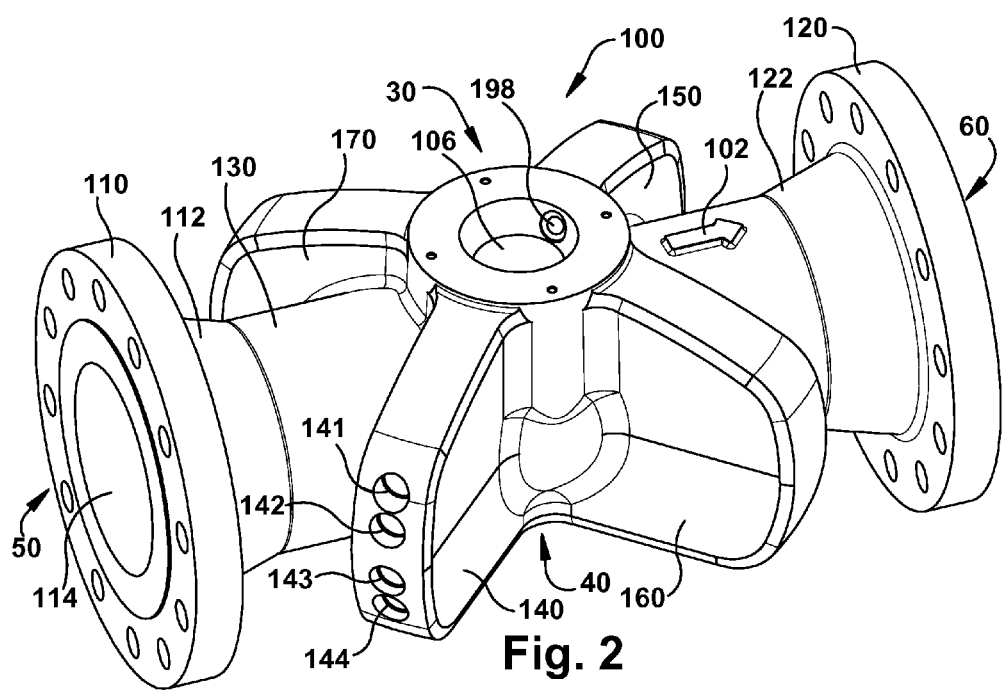
FIG. 2 is a perspective view of the first side of an exemplary flow cell.
Figure 3:
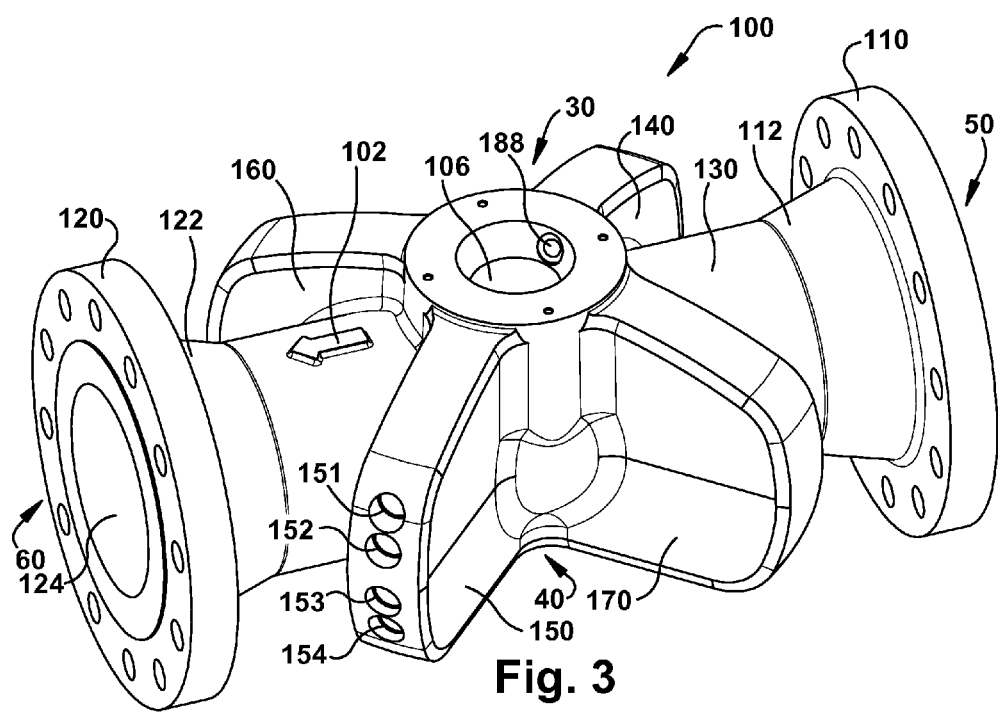
FIG. 3 is a perspective view of the second side of the exemplary flow cell.
Figure 4:
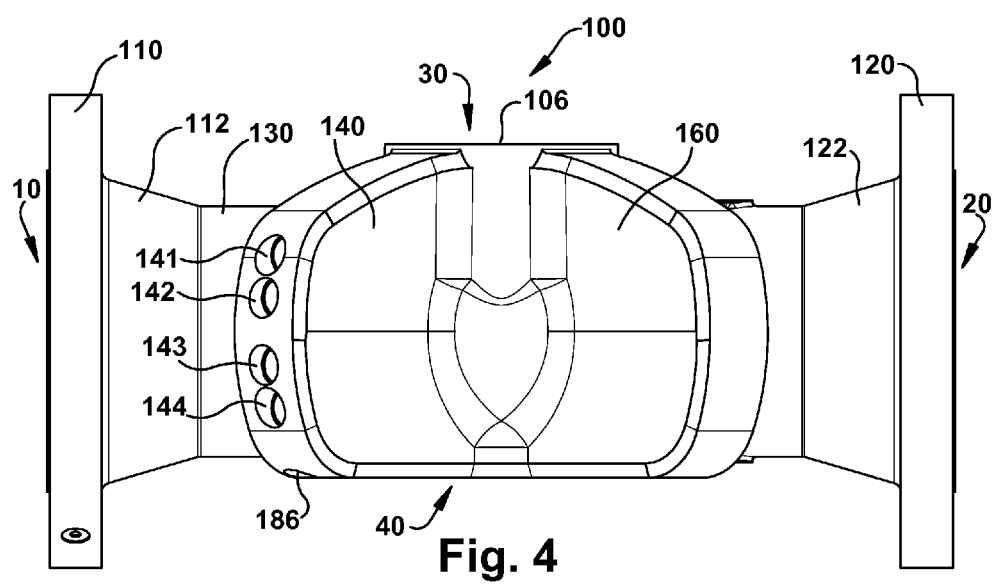
FIG. 4 is a side view of the first side of the exemplary flow cell.
Figure 5:
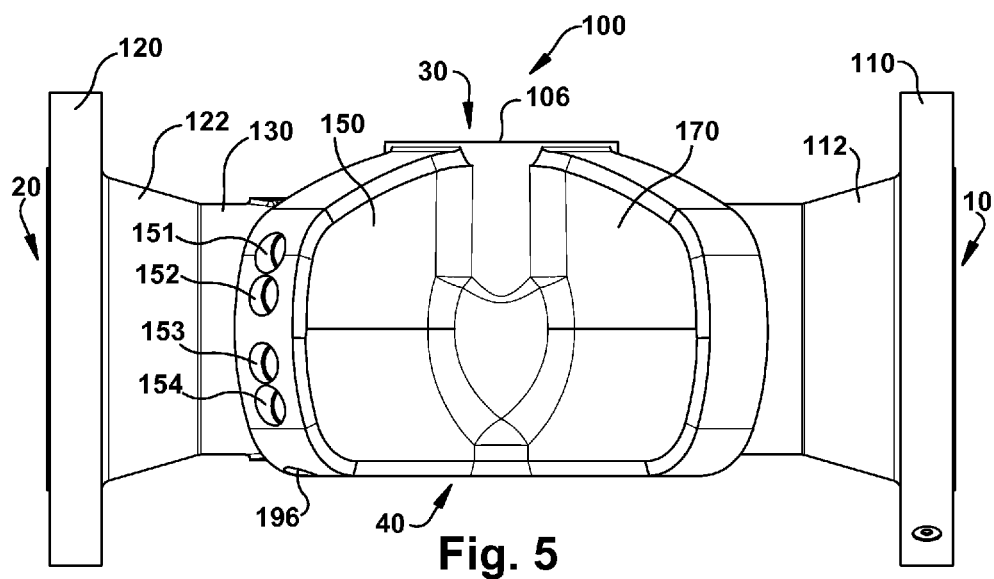
FIG. 5 is a side view of the second side of the exemplary flow cell.
Figure 6:
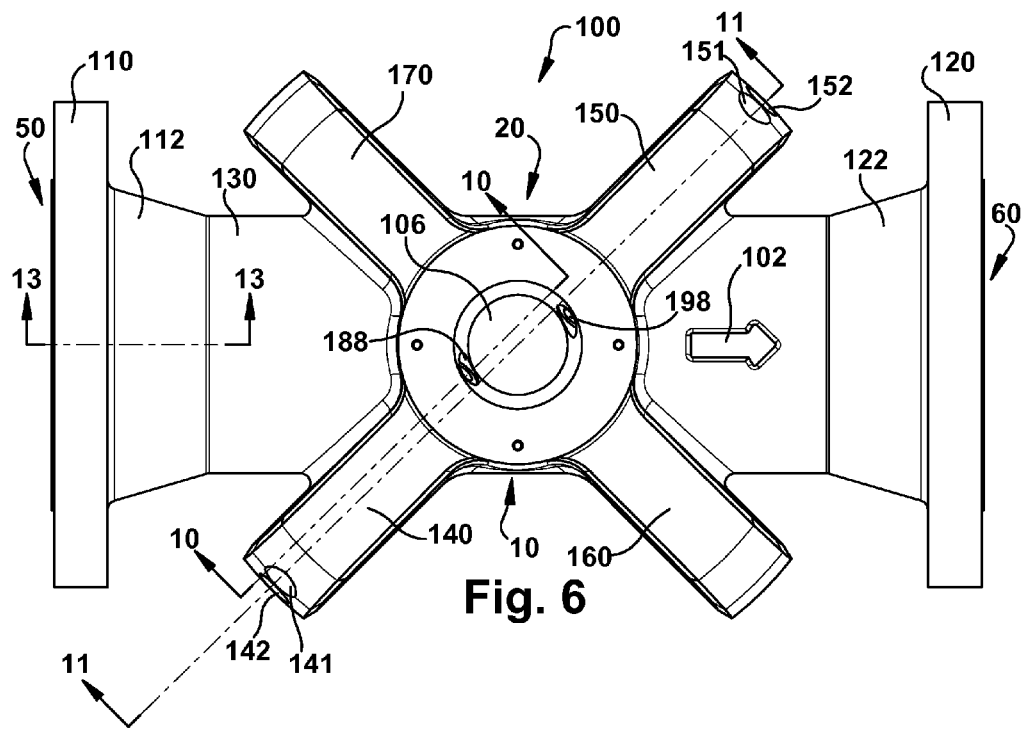
FIG. 6 is a top view of the top side of the exemplary flow cell.
Figure 7:
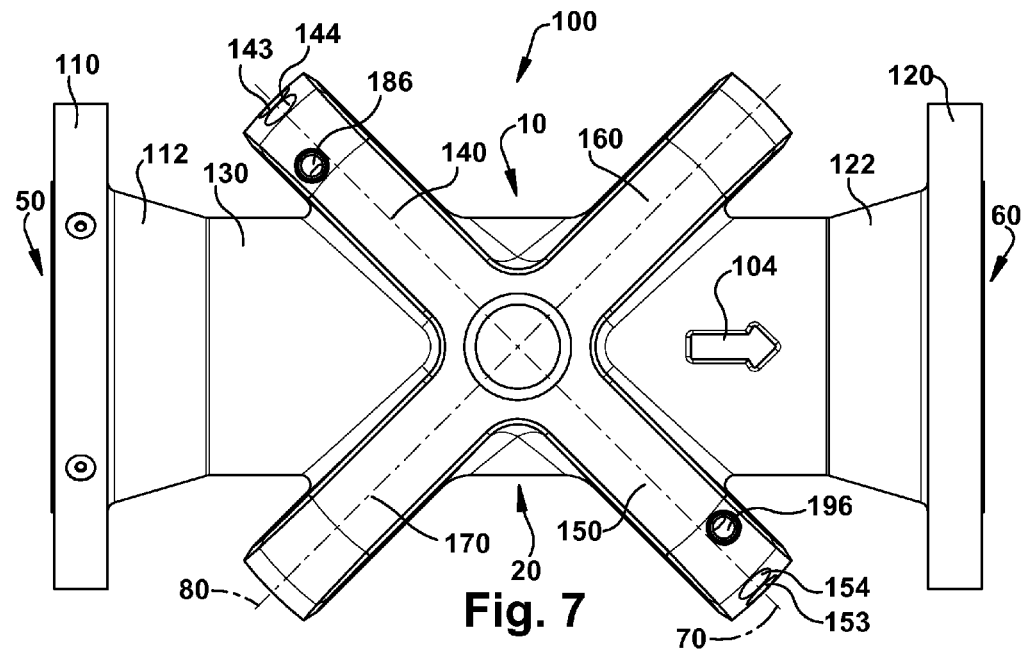
FIG. 7 is a bottom view of the bottom side of the exemplary flow cell.
Figure 8:
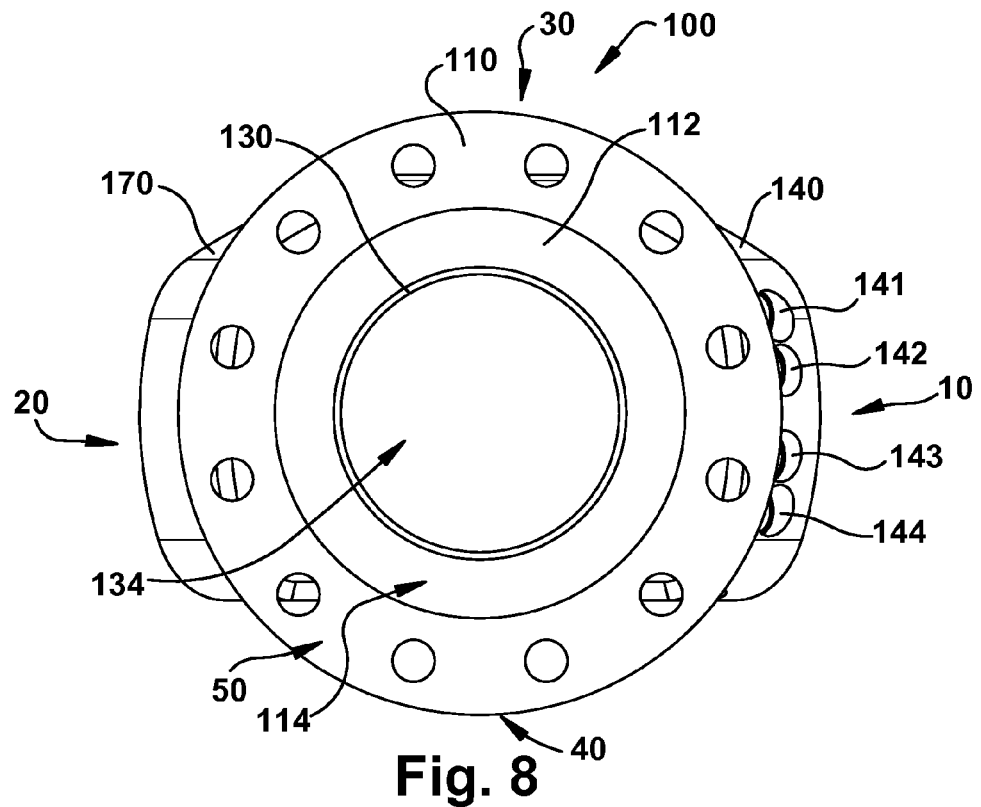
FIG. 8 is an end view of the first end of the exemplary flow cell.

As can be seen from a comparison of the exemplary flow cell 100 to the prior art flow cell of FIG. 1, the routing of the cables from the sensor ports 141, 142, 143, 144, 151, 152, 153, 154 internally within the cable channels 180, 190 of the flow cell 100 eliminates the need for many of the additional junction boxes, conduits, and fittings exterior to the flow cell 100, which decreases the size, cost, complexity, maintenance, and time required for the flow cell 100 installation. The elimination of these external components also allows for more sensor ports and chord locations at a single location on the flow cell 100. For example, while the prior art flow cell shown in FIG. 1 could only accommodate a maximum of two transducer assemblies and chords at a single location, the exemplary flow cell 100 can accommodate at least four sensor ports and chords at a single location. This eliminates the need for a crisscross configuration and related port effects when four ultrasonic paths are required, thereby increasing the accuracy of flow rate measurements.

The elimination of these external components (e.g., junction boxes, conduits, fittings, etc.) also eliminates the need for obtaining certification of compliance with local requirements for installations in hazardous locations for these external components. Since these requirements vary greatly and require different designs depending on which jurisdiction the flow cell 100 will be installed in, eliminating this certification issue reduces the number of designs and parts required, and simplifies installation process. Rather than having a different design to comply with each different set of local requirements, the exemplary flow cell 100 can have a single design that complies with all differing local requirements for hazardous locations and therefore can obtain worldwide or universal certification.

FIG. 12 is an exploded view of an exemplary transducer assembly 200 that can be installed in any of the sensor ports 141, 142, 143, 144, 151, 152, 153, 154 of the exemplary flow cell 100. The transducer assembly 200 can comprise an insert 206 with one or more o-rings 210 on the exterior of the insert 206 to provide a seal between the exterior of the transducer assembly 200 and the sensor body ports (e.g., the first chord upstream sensor port 141). The transducer 204 is located inside the insert 206 and can be held in place by a transducer holding nut 202 that can be threaded into the interior of the insert 206. An insert holding nut 208 can be threaded into the interior of the first chord upstream sensor port 141 to hold the insert 206 in place. The transducer 204 can transmit and receive ultrasonic signals into and from the fluid to be measured through the buffer 207 on the insert 206.

As seen in FIG. 11, all of the sensor ports 141, 142, 143, 144, 151, 152, 153, 154 of the exemplary flow cell 100 are shaped so as to receive the exemplary transducer assembly 200, allowing the same transducer assembly 200 to be used interchangeably in any of the sensor ports 141, 142, 143, 144, 151, 152, 153, 154, providing greater flexibility and ease of maintenance. The sensor ports 141, 142, 143, 144, 151, 152, 153, 154 of the exemplary flow cell 100 are also shaped to receive and place the transducer assembly 200 at predetermined positions in the sensor ports 141, 142, 143, 144, 151, 152, 153, 154. For example, given the stepped exterior of the exemplary transducer assembly 200 and the matching stepped interior of the sensor ports 141, 142, 143, 144, 151, 152, 153, 154, the installed position of the transducer 204 and buffer 207 can be determined in advance, avoiding the need for adjustments in the field during installation or the use of different length transducer assemblies that would depend on which chord the transducer assembly was used for. The use of these smaller diameter sensor ports 141, 142, 143, 144, 151, 152, 153, 154 and transducer assembly 200 can reduce the port effects produced within the flow cell and increase the accuracy of flow rate measurements. It will be understood that a number of different types of sensor assemblies and transducer assemblies 200 and correspondingly shaped sensor ports 141, 142, 143, 144, 151, 152, 153, 154 can be used in the exemplary flow cell 100, including sensor assemblies that do not use an insert.

Returning to FIG. 12 and with reference to FIGS. 2 through 9, a plug 148 can be used to seal the sensor ports 141, 142, 143, 144, 151, 152, 153, 154. In one embodiment, the plug 148 can be inserted (e.g., threaded) into the sensor ports 141, 142, 143, 144, 151, 152, 153, 154 to seal those openings in the exemplary flow cell 100. By using individual plugs 148 for each sensor port 141, 142, 143, 144, 151, 152, 153, 154 (rather than a single cover for all of the upstream sensor ports 141, 142, 143, 144 in the first sensor body quadrant 140 or a single cover for all of the downstream sensor ports 151, 152, 153, 154 in the second sensor body quadrant 150), a single sized plug 148 can be provided for sealing sensor ports on a variety of different sized flow cells 100. For example, the same plug 148 can be used to seal a sensor port 141, 142, 143, 144, 151, 152, 153, 154 on a 10 in. (25.4 cm) diameter flow cell 100 as could be used on a 36 in. (91.44 cm) diameter flow cell 100, providing greater flexibility and uniformity. Reducing the number of devices needed to seal these openings also reduces the certifications required for installations in hazardous locations as discussed. Similarly, a plug (of the same or different size as the plug 148 used for the sensor ports 141, 142, 143, 144, 151, 152, 153, 154) can also be inserted (e.g., threaded) into and seal the cable channel access ports 186, 188, 196, 198.

In one embodiment, the flow cell 100 is manufactured from a casting process, eliminating all welds. For example, in a casted flow cell 100, the first flange 110 and the second flange 120 are not welded to the sensor body 130. Exemplary materials that can be used for the flow cell 100 include stainless steel and carbon steel. The casting process is less expensive and time consuming than machining the sensor body 130 from a forged block of material.

FIG. 13 is a cross-section (see FIG. 6) of the first flange 110 and the first flange neck 112 of the exemplary flow cell 100, showing the first flange bore 114 and the sensor body bore 134 in a full bore configuration, where the first flange bore 114 and the sensor body bore 134 are the same or substantially the same diameter (e.g., approximately 6 in. (15.24 cm)). It will be understood that the exemplary flow cell 100 can have a diameter ranging from as small as 4 in. (10.16 cm) to as high as 36 in. (91.44 cm) or higher. As can be seen in FIG. 13, the diameter of the first flange bore 114 may need to be slightly larger than the diameter of the sensor body bore 134 to seamlessly mate with the inner diameter of the pipe to which the flow cell 100 is connected. For example, if the pipe uses a thinner wall (e.g., schedule 40) and has a larger inner diameter, the first flange bore 114 would be larger (e.g., 0.3 in (0.762 cm)) than if the pipe used a thicker wall (e.g., schedule 80) and had a smaller inner diameter. When the diameter of the first flange bore 114 is larger than the diameter of the sensor body bore 134, the first flange bore 114 can be tapered from the flange 110 to the sensor body 130. In some embodiments (e.g., when schedule 80 pipes are used), the diameter of the first flange bore 114 and the diameter of the sensor body bore 134 may be the same. If it is desirable to use a single cast for a particular flow cell diameter, the first flange bore 114 can be cast with the diameter equal to the smallest inner diameter pipe that may be encountered, and then machined down if a larger diameter is required for a larger inner diameter pipe. Regardless of differences in the first flange bore 114 between installations, the dimensions of the sensor body 130 (and its components) and the sensor body bore 134 could remain the same for all installations of a particular flow cell diameter, providing uniformity.

FIG. 14 is a cross-section of the first flange 310 and the first flange neck 312, showing the first flange bore 314 and the sensor body bore 134 in a reduced bore configuration, where the first flange bore 314 has a significantly larger diameter than the sensor body bore 134. For example, in an exemplary reduced bore configuration intended to improve flow characteristics for more accurate flow meter measurements, the diameter of the first flange bore 314 (approximately 8 in. (20.32 cm)) can be larger than the diameter of the sensor body bore 134 (approximately 6 in. (15.24 cm)). Regardless of whether a full bore configuration (FIG. 13) or reduced bore configuration (FIG. 14) is used for a particular flow cell diameter, the dimensions of the sensor body 130 (and its components) and the sensor body bore 134 could remain the same for all installations of a particular flow cell diameter with the flanges differing depending upon the installation, providing uniformity.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A flow cell for a plurality of sensor assemblies to communicate with a flow meter for measuring characteristics of a fluid comprising:
   a sensor body;
   a sensor body bore extending through the sensor body;
   a first sensor body quadrant extending outwardly from the sensor body bore on a first side of the flow cell;
   a second sensor body quadrant extending outwardly from the sensor body bore on a second side of the flow cell, wherein the second side is opposite the first side and wherein the first sensor body quadrant and the second sensor body quadrant are aligned with each other and extend in a first plane that intersects the sensor body bore;
   a first plurality of sensor ports extending through the first sensor body quadrant in the first plane;
   a second plurality of sensor ports extending through the second sensor body quadrant in the first plane, wherein the first and the second plurality of sensor ports provide openings from the exterior of the flow cell to the sensor body bore in which sensor assemblies can be inserted;
   a first cable channel extending internally within the first sensor body quadrant at least from the first plurality of sensor ports to a first access port on the exterior of the flow cell; and
   a second cable channel extending internally within the second sensor body quadrant at least from the second plurality of sensor ports to a second access port on the exterior of the flow cell, wherein the first cable channel and the second cable channel provide openings from the sensor ports in which the cables are routed internally within the flow cell to communicate with the flow meter.

2. The flow cell of claim 1, further comprising:
   a third sensor body quadrant extending outwardly from the sensor body bore on a first side of the flow cell; and
   a fourth sensor body quadrant extending outwardly from the sensor body bore on a second side of the flow cell and wherein the third sensor body quadrant and the fourth sensor body quadrant are aligned with each other and extend in a second plane that intersects the sensor body bore and the first plane.

3. The flow cell of claim 2, further comprising:
   a third plurality of sensor ports extending through the third sensor body quadrant in the second plane;
   a fourth plurality of sensor ports extending through the fourth sensor body quadrant in the second plane, wherein the third and fourth plurality of sensor ports provide openings from the exterior of the flow cell to the sensor body bore in which sensor assemblies can be inserted;
   a third cable channel extending internally within the third sensor body quadrant at least from the third plurality of sensor ports to a third access port on the exterior of the flow cell; and
   a fourth cable channel extending internally within the fourth sensor body quadrant at least from the fourth plurality of sensor ports to a fourth access port on the exterior of the flow cell, wherein the third cable channel and fourth cable channel provide openings from the sensor ports in which the cables are routed internally within the flow cell to communicate with the flow meter.

4. The flow cell of claim 1, wherein the first plurality of sensor ports further comprises a first plurality of cable windows providing openings from the first plurality of sensor ports to the first cable channel.

5. The flow cell of claim 1, wherein
   the first plurality of sensor ports comprises four sensor ports extending through the first sensor body quadrant in the first plane; and
   the second plurality of sensor ports comprises four sensor ports extending through the second sensor body quadrant in the first plane.

6. The flow cell of claim 1, further comprising a plug inserted into at least one of the first plurality of sensor ports extending through the first sensor body quadrant in the first plane to seal the sensor port.

7. The flow cell of claim 1, wherein the first cable channel extends from a bottom access port on the bottom side of the exterior of the flow cell to the first access port.

8. The flow cell of claim 7, further comprising a plug inserted into the bottom access port to seal the first cable channel.

9. The flow cell of claim 1, wherein the first plurality of sensor ports are shaped to receive the sensor assemblies and place the sensor assemblies at predetermined positions in the sensor ports.

10. The flow cell of claim 1, wherein the sensor assemblies are transducer assemblies.

11. The flow cell of claim 1, wherein the flow meter is an ultrasonic flow meter.

12. The flow cell of claim 1, further comprising:
    a first flange at a first end of the flow cell and a second flange on a second end of the flow cell; and
    a first flange neck connecting the first flange to a first end of the sensor body and a second flange neck connecting the second flange to a second end of the sensor body.

13. The flow cell of claim 12, further comprising a first flange bore extending through the first flange and the first flange neck, wherein the diameter of the first flange bore is substantially the same as the diameter of the sensor body bore.

14. The flow cell of claim 12, further comprising a first flange bore extending through the first flange and the first flange neck, wherein the diameter of the first flange bore is substantially greater than the diameter of the sensor body bore.

15. The flow cell of claim 1, wherein the flow cell in manufactured by casting.

16. A flow cell for a plurality of sensor assemblies to communicate with a flow meter for measuring characteristics of a fluid comprising:
   a sensor body;
   a sensor body bore extending through the sensor body;
   a first sensor body quadrant extending outwardly from the sensor body bore on a first side of the flow cell, wherein the first sensor body quadrant intersects the sensor body bore;
   a first plurality of sensor ports extending through the first sensor body quadrant, wherein the first plurality of sensor ports provide openings from the exterior of the flow cell to the sensor body bore in which sensor assemblies can be inserted; and
   a first cable channel extending internally within the first sensor body quadrant at least from the first plurality of sensor ports to a first access port on the exterior of the flow cell, wherein the first cable channel provide openings from the sensor ports in which the cables are routed internally within the flow cell to communicate with the flow meter.

17. The flow cell of claim 16, wherein the first plurality of sensor ports further comprises a first plurality of cable windows providing openings from the first plurality of sensor ports to the first cable channel.

18. The flow cell of claim 16, further comprising a plug inserted into at least one of the first plurality of sensor ports extending through the first sensor body quadrant to seal the sensor port.

19. The flow cell of claim 16, wherein the first cable channel extends from a bottom access port on the bottom side of the exterior of the flow cell to the first access port.

20. The flow cell of claim 19, further comprising a plug inserted into the bottom access port to seal the first cable channel.

* * * * *